United States Patent [19]

Ford

[11] Patent Number: 5,103,889
[45] Date of Patent: Apr. 14, 1992

[54] DUAL FUNCTION WINDOW BLIND CORD SYSTEM

[75] Inventor: Alan A. Ford, Sturgis, Mich.

[73] Assignee: Cooper Industries, Inc., Houston, Tex.

[21] Appl. No.: 590,737

[22] Filed: Oct. 1, 1990

[51] Int. Cl.⁵ ................................................ E06B 9/38
[52] U.S. Cl. .................................. 160/177; 160/178.1
[58] Field of Search .............. 160/178.1, 178.2, 168.1, 160/177, 900, 176.1; 16/114 B, 122; 24/115 H, 115 M, 129 R, 129 A

[56] References Cited

U.S. PATENT DOCUMENTS

| | | | |
|---|---|---|---|
| 2,546,534 | 3/1951 | Znidarsic | 24/115 M X |
| 2,877,527 | 3/1959 | Bond | 24/115 H |
| 3,605,852 | 9/1971 | Vecchiarelli | 160/168.1 |
| 3,633,646 | 1/1972 | Zilver | 160/178.2 X |
| 3,727,665 | 4/1973 | Debs | 160/178.2 |
| 3,879,147 | 4/1975 | Morell | 24/115 M X |
| 3,931,846 | 1/1976 | Zilver | 160/178.2 |
| 4,078,277 | 3/1978 | McCracken | 24/115 M |
| 4,635,698 | 1/1987 | Anderson | 160/178.2 |
| 4,909,298 | 3/1990 | Langhart et al. | 160/178.1 |
| 4,967,824 | 11/1990 | Colson et al. | 160/178.1 |

*Primary Examiner*—David M. Purol
*Attorney, Agent, or Firm*—Eddie E. Scott; William B. Patterson; Alan R. Thiele

[57] ABSTRACT

The invention is for a cord system for a dual function window blind. A looped cord acting with a master carrier controls the traversing movement of the vertical vanes. The other, smaller diameter cord controls the tilt of the vanes and is not a looped cord but a much thinner cord with a tassel attached at each end. The tilting is performed by pulling the tassels whereas the traverse is performed by pulling the heavier cord. The first, looped cord slides freely through holes in the tassels. The result is the appearance of a single cord with a tassel on each side.

3 Claims, 5 Drawing Sheets

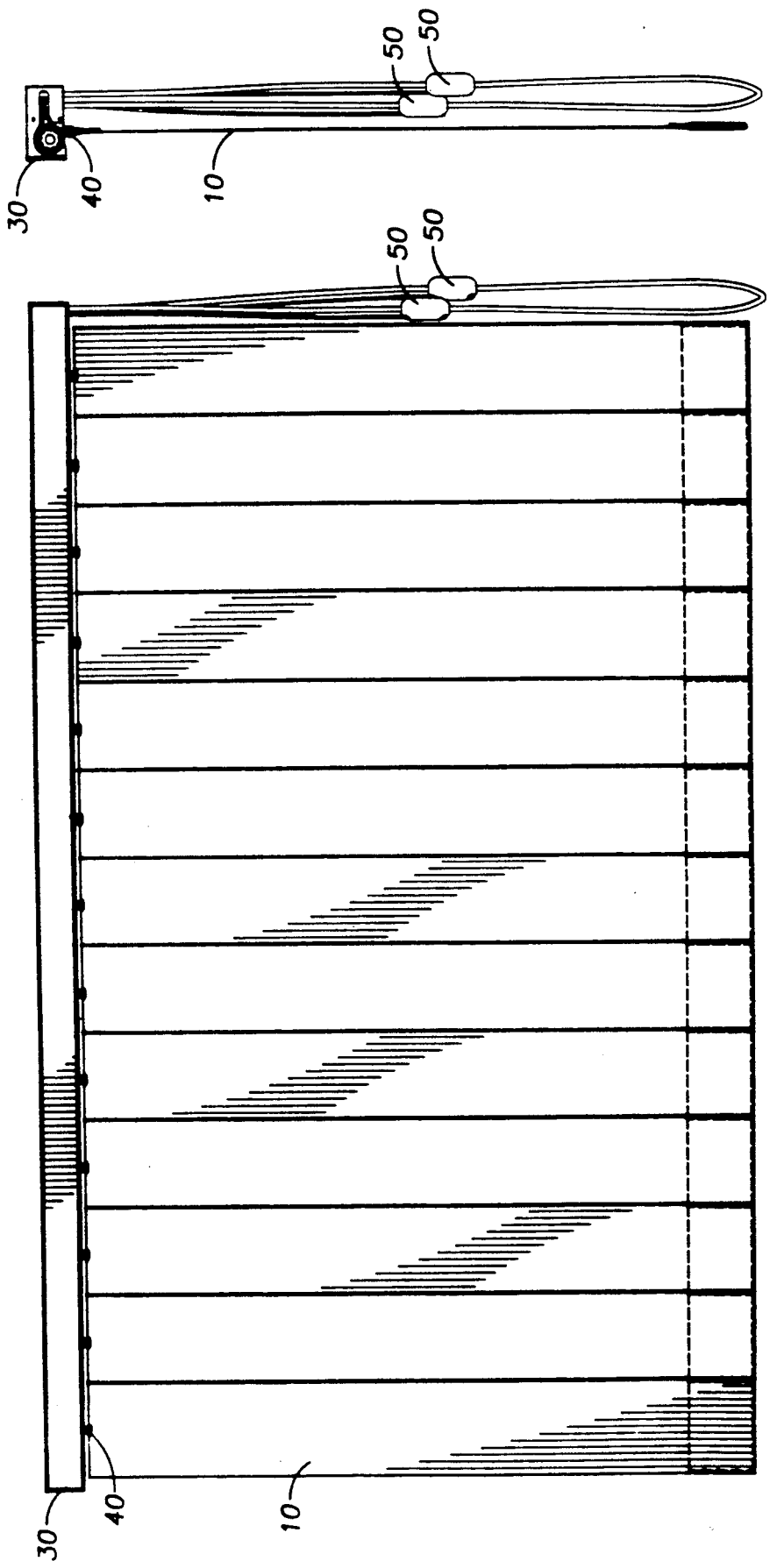

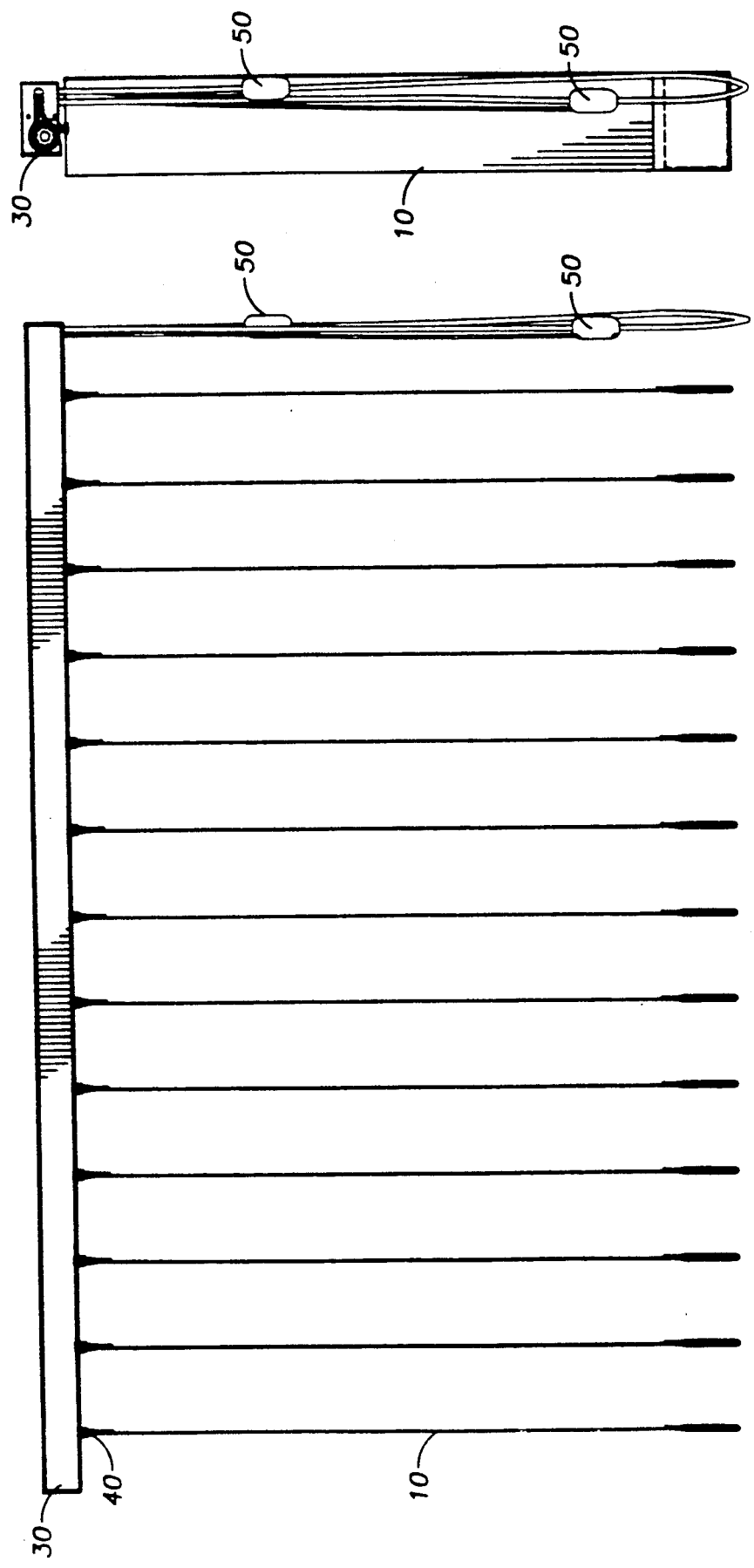

DUAL FUNCTION WINDOW BLIND CORD SYSTEM

BACKGROUND OF THE INVENTION

The present invention relates to a cord system for a drapery rod. More specifically, the invention relates to a system of using cord tassels to simplify two functions of a window blind.

Many window blind systems currently perform two separate functions. For example, vertical blinds not only move across the rod but the individual vanes can also be tilted about a vertical axis. Similarly, vanes in a horizontal blind arrangement can often be tilted in addition to being raised or lowered. Presently, distinct functions are controlled with separate cords that form loops. While the separate cord arrangement is effective, it has two disadvantages. First, the additional cord is unsightly and detracts from the appearance of the drapery. Second, two separate cord assemblies are confusing to the user who cannot distinguish one cord from the other and often pulls the wrong one.

There is a need therefore, for a dual function cord system that simplifies the identity of cords and the functions they control with respect to a window blind.

There is also a need for a dual function drapery cord system that has a more pleasing appearance than arrangements consisting of separate, looped cords.

SUMMARY OF THE INVENTION

The subject of this invention is a dual function cord system for a window blind that simplifies the identity of the cords and has a more pleasing appearance. Typically, the invention is used with a dual function rod that combines functions of tilting and traversing of vertical vanes. According to the present invention, a looped cord acting with a master carrier controls the traversing movement of the vertical vanes. The other, smaller diameter cord controls the tilt of the vanes and is not a looped cord but a much thinner cord with a tassel attached at each end. The tilting is performed by pulling the tassels whereas the traverse is performed by pulling the heavier cord. The first, looped cord slides freely through holes in the tassels. The result is the appearance of a single cord with a tassel on each side.

BRIEF DESCRIPTION OF THE FIGURES

A better understanding of the system of the present invention may be had by reference to the figures wherein:

FIG. 1A is a front view of a window blind showing the vertical blinds closed and utilizing the cord assembly of the present invention.

FIG. 1B is an end view of a window blind with the cord system of the present invention.

FIG. 2A is a front view of a window blind showing the vertical blinds in the open position and utilizing the cord assembly of the present invention.

FIG. 2B is an end view of a window blind with the cord system of the present invention.

BRIEF DESCRIPTION OF THE EMBODIMENTS

A better understanding of the background of the invention can be had by reference to FIG. 1A. A traverse rod 30 spans the length of a window and supports a set of vertical vanes 10 through vane hangers 40. The vanes depicted in the figures are of fabric material and are equipped with a weight 20 sewn at the bottom to keep them hanging straight. However, the present invention could be used with vanes of any material and is not limited to use with fabric vanes.

Figure 4A:
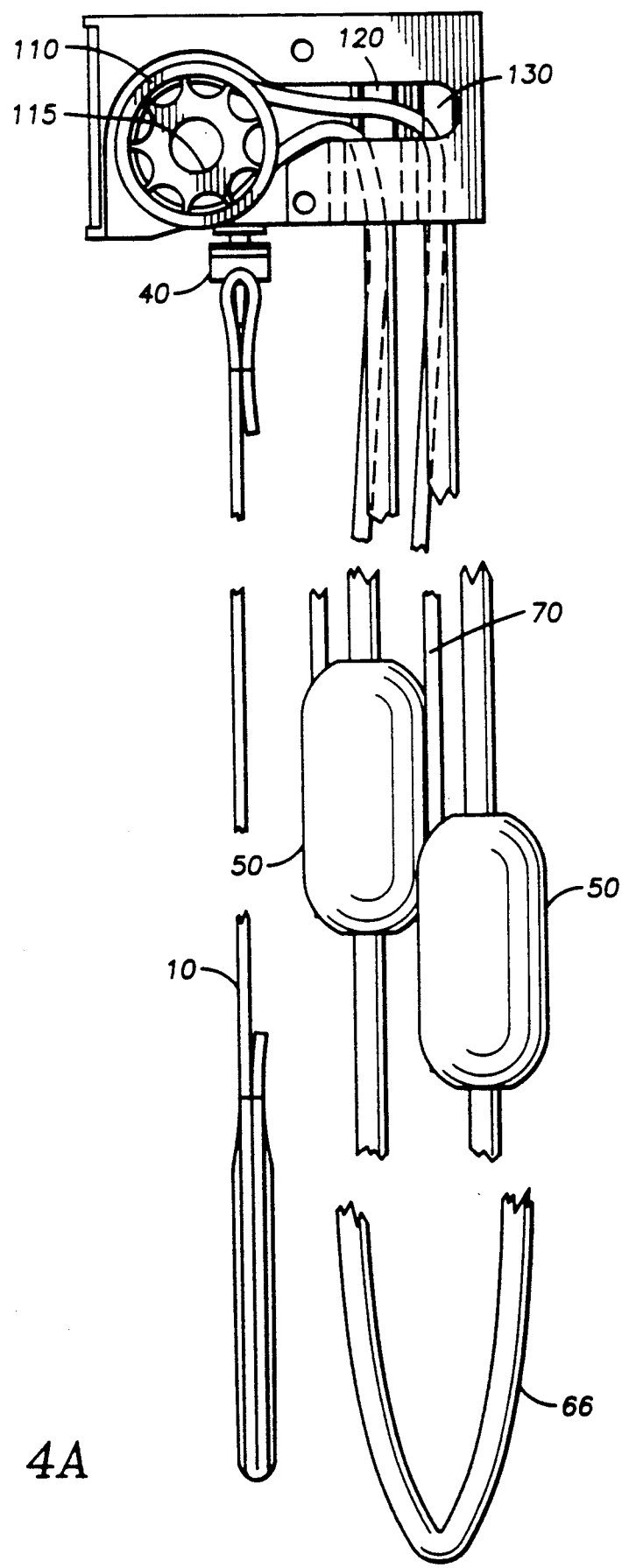
FIG. 4A is an end view, partially in section, of the window blind cord system that is the subject of the present invention.
Figure 4B:
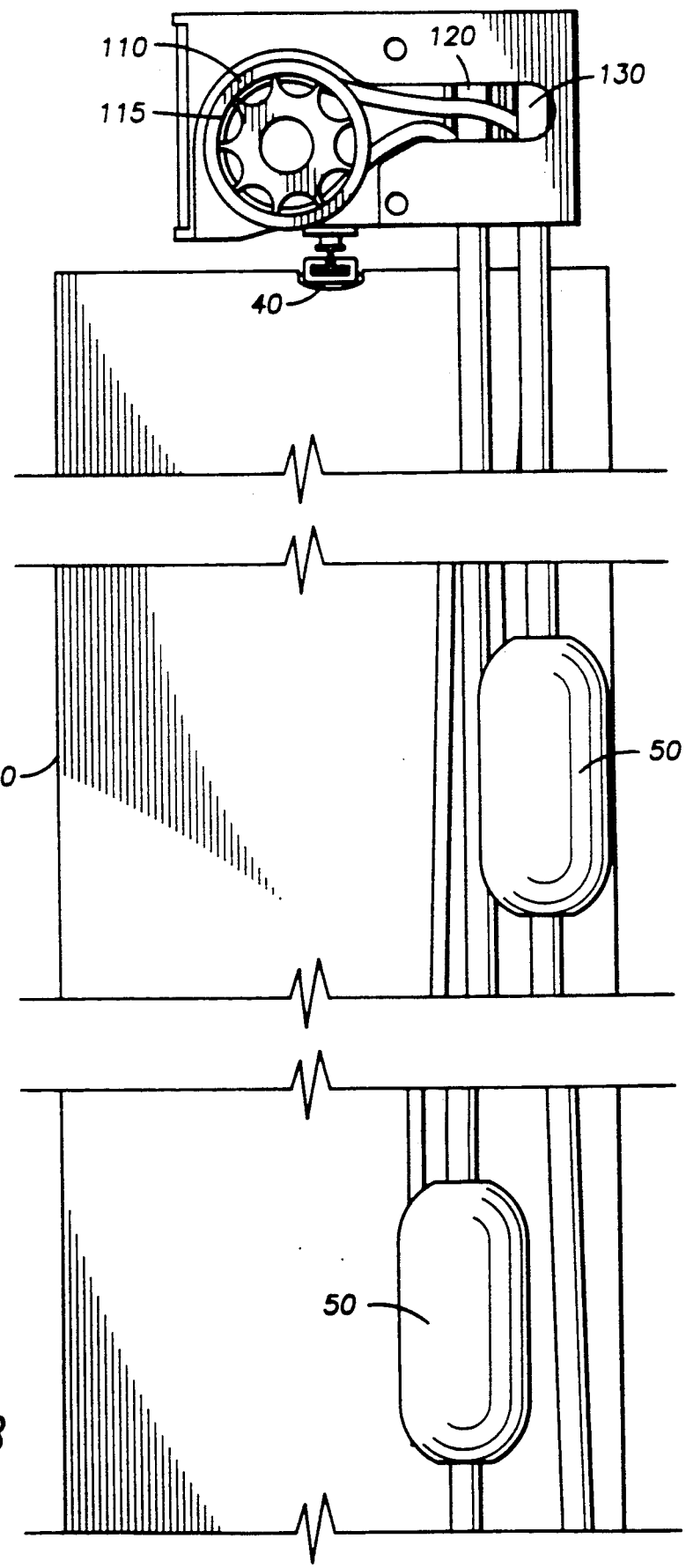
FIG. 4B is also an end view, partially in section, of the window blind cord system that is the subject of the present invention depicting the vertical blind in the open position.

Shown at the right hand side of FIG. 1A and in FIG. 1B is the cord system which is the subject of the present invention. The workings of the cord system can best be appreciated by reference to FIGS. 4A and 4B. FIG. 4A shows a cord 60 which is looped at the bottom. Cord 60 works with a pair of pulleys 120,130 at the near end of the rod, a pulley at the opposite end of the rod and a master carrier in the rod to move the vanes laterally to one side, away from the cord assembly in a traversing fashion. The traversing movement is accomplished by pulling different sides of cord 60.

The cord system also includes another smaller diameter cord 70 which is not looped but terminates at each end into a tassel 50. This smaller diameter cord acts with a pulley 110 and an elongated drive rod 115 running the length of the rod 30 to tilt the individual vanes by rotating the vane hangers 40. Because each end of the smaller diameter cord 70 is attached to a tassel, the tilting can be controlled by pulling the tassels.

Figure 3A:
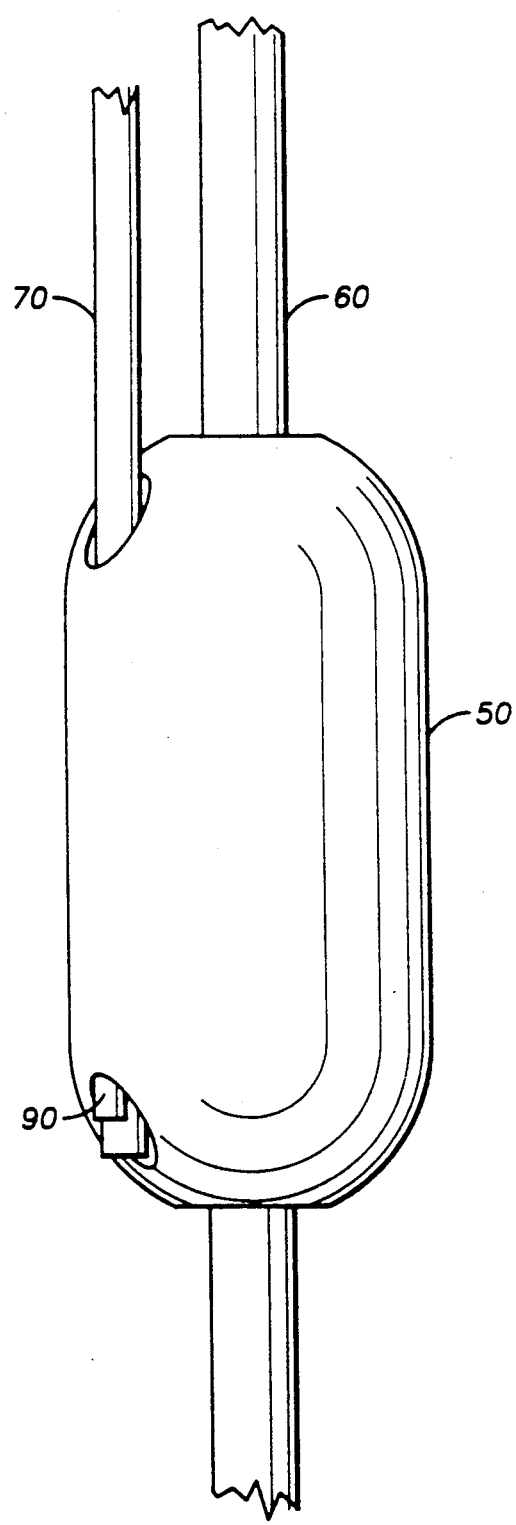
FIG. 3A is a side view of a tassel that is a part of the present invention.
Figure 3B:
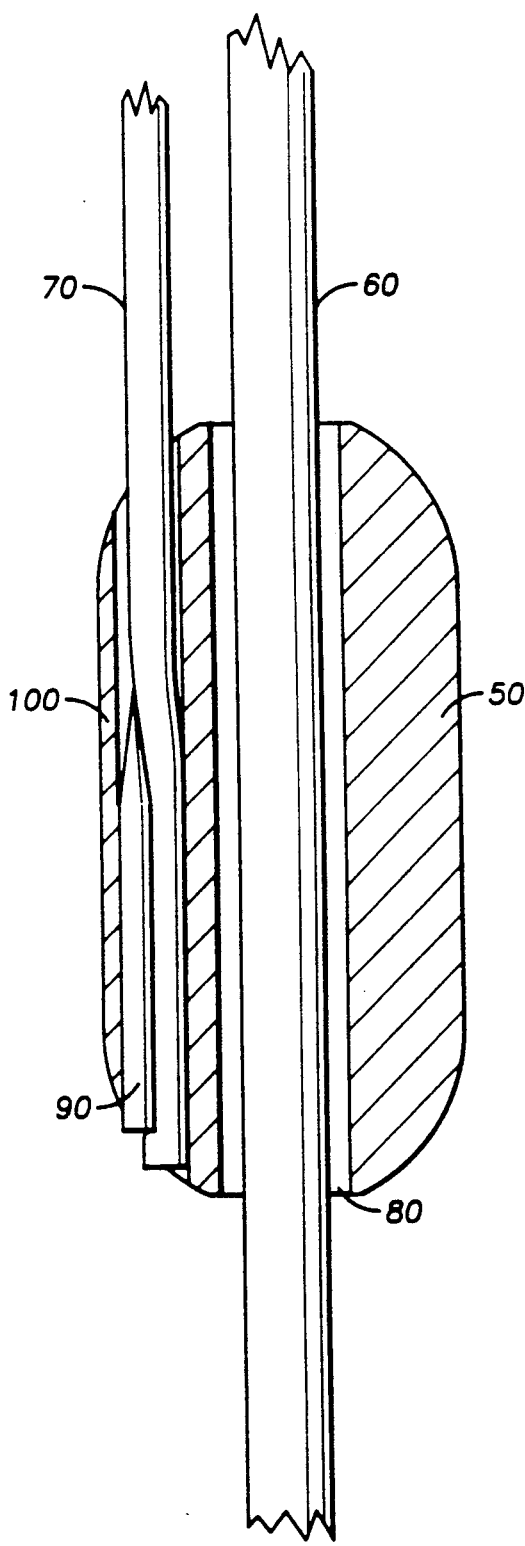
FIG. 3B is a side view, partially in section, of a tassel that is the subject of the present invention.

The workings of the tassels can be best understood by reference to FIGS. 3A and 3B. FIG. 3B is shown in section and depicts tassel 50 with cord 60 passing through aperture 80 which is larger than the cord and allows it to pass through without interference. The smaller diameter cord 70, on the other hand, terminates in tassel 50 and is held tightly in the tassel with a shim 90 placed between the cord and the outside edge of the hole 100. While a shim is used in the preferred embodiment, one skilled in the art will understand that the cord end could be affixed in any of several different ways including the use of glue or a knot tied at the end of the cord and the invention is not limited to the use of a shim.

By affixing the smaller diameter cord to the tassel 50, the tassel can be pulled instead of the smaller diameter cord. Movement of the tassel however, will not effect the heavier cord 60 as it will pass smoothly through the tassel. While the preferred embodiment utilizes two tassels, the invention could be used with a single tassel at one end of the smaller diameter cord.

While the preferred embodiment describes a dual system to control the tilting and traversing of vertical blinds, one skilled in the art will recognize that the invention would be equally as useful to control two functions of a horizontal blind like raising, lowering and tilting and it will be understood that the present invention is not limited to use with vertical blinds or tilting and traversing functions.

Using the present system, the user pulls the tassels to tilt the vanes and pulls the heavier cord to traverse the vanes. The combination of the two cords with the tassel allows the different functions of the system to be easily identified and keeps the two cords together, thus creating the appearance of one cord and solving the problem of the unsightly appearances and confusion between two similar cords.

I claim:

1. In a window blind comprising a plurality of vertical vanes arranged for a traversing movement and a tilting movement, a dual-function window blind cord system for moving said vertical vanes, said system comprising:
   a first cord controlling the traversing movement of said vertical vanes in said window bind, said first cord defining first and second runs which terminate in a loop;
   a second cord controlling the tilting movement of said vertical vanes in said window bind, said second cord terminating in first and second ends;
   a first tassel, said first tassel slidably attached to said first run of said first cord and having means for retaining said first end of said second cord; and
   a second tassel, said second tassel slidably attached to said second run of said first cord and having means for retaining said second end of said second cord; wherein, movement of one of said first and second tassels only effects movement of said second cord thereby tilting said vertical vanes.

2. The window blind cord system as described in claim 1, wherein said slidable attachment of said tassel to said first cord includes a substantially vertical first aperture, said first aperture constructed and arranged to allow said first cord to pass freely through said tassel.

3. The window bind cord system described in claim 2, wherein said tassel is oblong.

* * * * *